(12) United States Patent
Viswanathan et al.

(10) Patent No.: US 10,824,113 B2
(45) Date of Patent: Nov. 3, 2020

(54) METHOD FOR PROCESSING A HOLOGRAPHIC IMAGE

(71) Applicant: Orange, Paris (FR)

(72) Inventors: Kartik Viswanathan, Rennes (FR); Patrick Gioia, Servon sur Vilaine (FR)

(73) Assignee: ORANGE, Paris (FR)

( * ) Notice: Subject to any disclaimer, the term of this patent is extended or adjusted under 35 U.S.C. 154(b) by 232 days.

(21) Appl. No.: 15/761,300

(22) PCT Filed: Sep. 6, 2016

(86) PCT No.: PCT/FR2016/052207
§ 371 (c)(1),
(2) Date: Mar. 19, 2018

(87) PCT Pub. No.: WO2017/046478
PCT Pub. Date: Mar. 23, 2017

(65) Prior Publication Data
US 2018/0267465 A1    Sep. 20, 2018

(30) Foreign Application Priority Data

Sep. 17, 2015    (FR) .................................... 15 58727

(51) Int. Cl.
*G03H 1/08*     (2006.01)
*G03H 1/22*     (2006.01)
*H04N 19/64*    (2014.01)

(52) U.S. Cl.
CPC ............. *G03H 1/0808* (2013.01); *G03H 1/22* (2013.01); *G03H 2001/0825* (2013.01);
(Continued)

(58) Field of Classification Search
CPC .. G03H 1/0808; G03H 1/0866; G03H 1/0891; G03H 2001/0088;
(Continued)

(56) References Cited

U.S. PATENT DOCUMENTS

2015/0029566 A1*   1/2015   Gioia ....................... G03H 1/22
                                                            359/9
2016/0327905 A1    11/2016  Gioia et al.

FOREIGN PATENT DOCUMENTS

WO    2013121140 A1    8/2013
WO    2015097358 A2    7/2015

OTHER PUBLICATIONS

Ding et al. "Wavelet packet compression for volume holographic image recognition" Dec. 13, 2002, Optics communications, 216 (2003) 105-113 (Year: 2002).*

(Continued)

*Primary Examiner* — William R Alexander
*Assistant Examiner* — Ephrem Z Mebrahtu
(74) *Attorney, Agent, or Firm* — David D. Brush; Westman, Champlin & Koehler, P.A.

(57) ABSTRACT

A method for processing a sequence of holographic images with a view to playing the images back on a holographic display device to at least one viewer. A subset of wavelet coefficients relevant for the reconstruction of a sub-hologram visible for the at least one viewer from at least one viewing point is selected from a decomposition of at least one holographic image on a wavelet basis and information representative of a location of the at least one viewer in a repository of the display device. In the method, decomposition of the at least one holographic image is carried out on a Shannon wavelet basis.

8 Claims, 7 Drawing Sheets

(52) U.S. Cl.
CPC . *G03H 2001/0833* (2013.01); *G03H 2226/04* (2013.01); *G03H 2226/05* (2013.01); *H04N 19/647* (2014.11)

(58) Field of Classification Search
CPC ... G03H 2001/0825; G03H 2001/0833; G03H 1/22; H04N 19/647
See application file for complete search history.

(56) References Cited

OTHER PUBLICATIONS

Cattani, Carlo. "Shannon Wavelets Theory", Mathematical Problems in Engineering. Jun. 13, 2008.
Alexei Souvorov et al. "Multiresolution phase retrieval in the Fresnel region by use of wavelet transform", Journal of the Optical Society of America. Feb. 28, 2006.
Kartik Viswanathan et al. "Morlet Wavelet transformed holograms for numerical adaptive view-based reconstruction", Proceedings of SPIE. Sep. 15, 2014.
Kartik Viswanathan et al. "Wavelet compression for Holograms: Towards a view-dependent framework", Proceedings of SPIE. Sep. 26, 2013.
International Search Report dated Oct. 26, 2016, for corresponding International Application No. PCT/FR2016/052207, filed Sep. 6, 2016.
Written Opinion of the International Searching Authority dated Oct. 26, 2016, for corresponding International Application No. PCT/FR2016/052207, filed Sep. 6, 2016.

* cited by examiner

METHOD FOR PROCESSING A HOLOGRAPHIC IMAGE

CROSS-REFERENCE TO RELATED APPLICATIONS

This Application is a Section 371 National Stage Application of International Application No. PCT/FR2016/052207, filed Sep. 6, 2016, which is incorporated by reference in its entirety and published as WO 2017/046478 A1 on Mar. 23, 2017, not in English.

TECHNICAL FIELD

The present invention relates generally to the field of image processing, and more specifically to the coding of images in three dimensions (3D) and of sequences of images in three dimensions.

More particularly, the present invention concerns the coding of at least one holographic pattern on which a light signal is recorded representing the light received by at least one object in perspective in a scene.

The invention can notably, but not exclusively, be applied to the video coding implemented in present-day video coders and their amendments (MPEG, H.264, H.264 SVC, H.264 MVC, etc.) or those to come (ITU-T/VCEG (H.265) or ISO/MPEG (HEVC)), and to the corresponding decoding.

PRIOR ART

Multiview or stereoscopic three-dimensional video techniques sometimes cause discomfort to audience members. These techniques try to delude our vision system by displaying a different image specific to each eye so as to obtain a depth effect. The human eye is adapted to track moving objects and focus on them when they become close. However, the images displayed with conventional 3D techniques are displayed on a fixed plane. The audience number therefore must constantly suppress this reflex for focusing on the objects, thereby frequently causing headaches or other feelings of sickness.

Holograms are known to contain all the intermediate planes of a three-dimensional scene. The presence of these intermediate planes allows the human eye to focus normally on close objects, thus sharply reducing the sensations of discomfort felt by audience members.

However, holograms are particularly large and difficult to compress since they contain the data necessary to reconstruct a holographic image in different viewing points, this data containing very little redundancy that can be exploited by a conventional coder. Compression techniques usually used to encode image sequences can be extended and generalized to encode holographic sequences, but the very nature of such images prevents satisfactory results from being obtained. Specifically, these techniques are generally based on splitting images and movement predictions into blocks, while the holographic images are presented for their part in the form of diffraction patterns, the variations of which bear little correlation with the 3D scene which they represent.

International patent application WO 2015/097358 A2 describes a method for processing holographic images which proposes exploiting the directional character of the spectrum associated with a Gabor wavelet and the direction of the light after diffraction through this wavelet at a point of the holographic image. Knowing the location of one or more observers of the display device, the invention establishes which wavelets cause the emission of light diffracted in the direction of the observers and, in this way, contribute to reconstructing the sub-hologram seen by the observer or observers from their observation points. Thus, the method provides for selecting a subset of relevant wavelet coefficients for the reconstruction of the sub-hologram visible for this or these observers on the display device. The other coefficients are not taken into account, thereby leading to the elimination of a non-negligible quantity of data, this quantity being all the more significant as the number of observers is reduced.

"Sub-hologram" is understood to mean a set of patterns of a hologram producing a diffraction toward a particular observation point. Within the framework of this invention, there is also a set of wavelet coefficients enabling the reconstruction of a hologram visible from one or more particular observation points.

Although providing a considerable reduction in the quantity of data to be processed, this technique exhibits drawbacks.

Figure 2A:
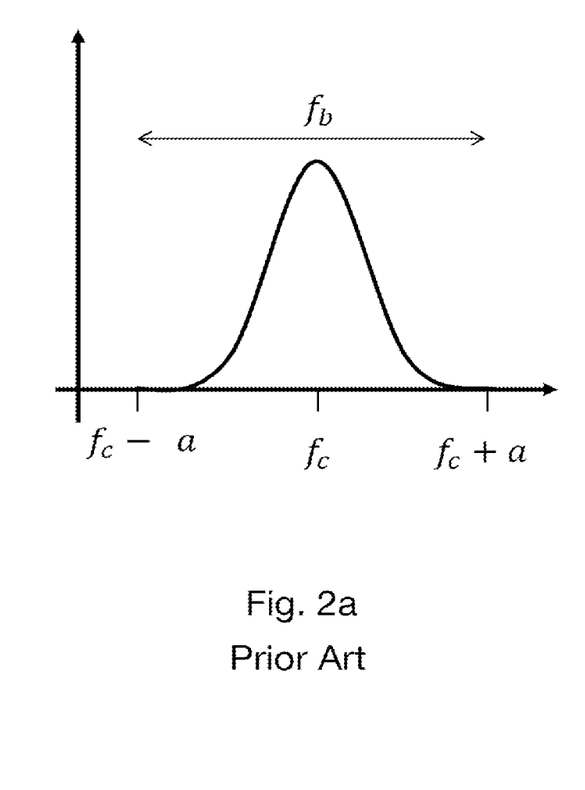
FIG. 2a illustrates the frequency spectrum of a Gabor wavelet, as described previously.

FIG. 2a illustrates the frequency spectrum of a Gabor wavelet, such as the one used in the prior art. It is observed that the frequency spectrum is tightened around its spatial frequency fc. A light beam diffracted by such a wavelet produces a narrow light cone, concentrated around its direction of incidence. The information providing a correct reconstruction of the hologram is therefore highly localized at the center of this cone and degrades very quickly while moving away from it. Thus, because the information providing a good reconstruction of a hologram is highly localized, the use of Gabor wavelets makes the reconstruction extremely sensitive to the position of the user. New Gabor wavelets must thus be calculated at the slightest movement of the observer, and the calculation time and memory required increase significantly with the number of observers. For example, simple movements of the head of an observer means that a new set of wavelets, suitable for the new position, must be selected. Another drawback of the prior-art technique is related to the high complexity of the processing operations and the quantity of memory required to obtain a sub-hologram.

There is therefore a need for a technical solution for achieving compression performance levels that are at least identical to the prior art, which solution is both more robust against slight changes in viewpoints and less complex in terms of calculation times and memory usage.

SUMMARY OF THE INVENTION

The invention addresses this need by proposing a method for processing a sequence of holographic images with a view to reproducing it on a holographic display device displaying to at least one observer, a subset of relevant wavelet coefficients for the reconstruction of a sub-hologram visible for the at least one observer from at least one observation point being selected from a decomposition of at least one holographic image on a wavelet basis and from information representing a location of the at least one observer with respect to the display device, the method being notable in that the decomposition of the at least one holographic image is carried out on a Shannon wavelet basis.

Thus, the invention relies on a novel and inventive approach to the decomposition of a holographic image into wavelets. The inventors have sought to optimize calculation times and have discovered that a decomposition of the holographic image into Shannon wavelets (Cattani, C.

"Shannon Wavelets Theory", *Mathematical problems in engineering*) provides for sharply improving performance over the prior art.

The invention thus consists in exploiting the rectangular character of the Fourier transform of a Shannon wavelet, the directional character of the spectrum associated with a Shannon wavelet and the relationship between the frequency localization of a Shannon wavelet and the direction of the light after diffraction through this wavelet at a point of the holographic image.

Figure 2B:
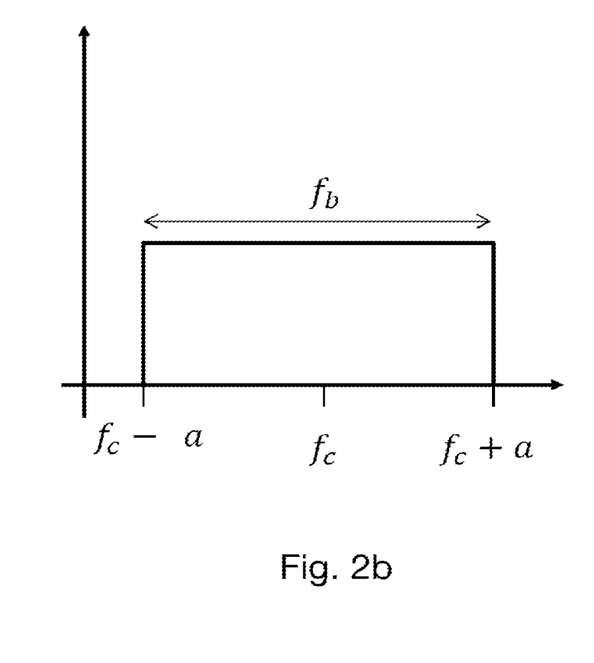
FIG. 2b illustrates the frequency spectrum of a Shannon wavelet.

FIG. 2b illustrates the frequency spectrum of a Shannon wavelet. It is observed that the frequency spectrum has the same energy over the entire frequency band $[f_c-a, f_c+a]$, unlike a Gabor wavelet the spectrum of which is represented in FIG. 2a. The Fourier transform of a Shannon wavelet is a rectangular function (or gate function). A light beam diffracted by such a wavelet produces a narrow light cone, concentrated around its direction of incidence. The information for a correct reconstruction of the hologram is available over the entire intersection between the light cone and the observation plane. Conversely, when Gabor wavelets are used according to the prior art, the information for a correct reconstruction of the hologram deteriorates rapidly when the observer moves away from the center of the intersection between the light cone and the observation plane.

Thus, the invention provides for solving the technical problem of the robustness of a reconstruction of a holographic image upon slight movements of an observer without increasing the complexity of the processing operations. The use of Shannon wavelets means that the reconstruction is a lot less sensitive to the position of the user and a small movement of the observer does not necessarily require recalculation of a new set of wavelets suitable for the new position. On the other hand, the particular shape of the Fourier transform of a Shannon wavelet provides a significant optimization of calculation times and of the memory required to calculate the sub-holograms.

According to a particular implementation, the method is such that the calculation of the sub-hologram visible by the at least one observer from the at least one observation point comprises the following steps:

Determination of the maximum and minimum diffraction angles of an incident ray on the hologram, which are subtended by the at least one observation point, Determination of the minimum and maximum frequencies for creating a diffraction of an incident ray according to the determined angles, Determination of a Shannon wavelet, the frequency range of which is equal to the difference between the determined frequencies and the central frequency of which is equal to half the sum of the determined frequencies, and Obtaining a sub-hologram by convolution of the holographic image and of the determined Shannon wavelet.

Thus, the method, in comparison with the prior-art technique, provides for calculating a sub-hologram visible from the observation point very effectively in terms of calculation times and memory used.

Conventionally, the calculation of a sub-hologram suitable for viewing from a particular position is performed by a scalar product of a set of wavelets selected for the viewpoint and the hologram. For example, the calculation of a sub-hologram $H_V$ visible from a point V comprises $L^2 \times n \times m \times N \times M$ complex multiplications and $L^2 \times n \times m \times N \times M$ complex additions, where L is the number of points of the Shannon wavelet, n and m are the dimensions in points of the hologram N and M are the dimensions of the area of visibility of the hologram. The memory needed for such a calculation is of $L^2 \times n \times m \times N \times M$ complex values. Such complexity requires storing the calculated sub-holograms with a view to their re-use since a real-time calculation is out of the question.

The method provides for calculating the sub-holograms corresponding to the position of an observer in the frequency domain, based on a simple convolution operation. Thus, it is no longer necessary to calculate a scalar product of the hologram and the selected wavelets, the method providing for a significant reduction in the calculation time and in the memory needed for calculating a sub-hologram in comparison with the prior art. In particular, this new method for calculating a sub-hologram enables the calculation of a sub-hologram in real time and results in not needing to save the calculated sub-holograms.

The invention thus brings about a substantial gain both in the calculation time and in memory occupation.

According to a particular implementation, the method is such that the convolution operation is carried out in the frequency domain between the Fourier transform of the hologram and the Fourier transform of the determined Shannon wavelet.

The rectangular nature of the Fourier transform of a Shannon wavelet means that the convolution operation can be carried out in the frequency domain, this operation hence corresponding to a simple multiplication. The method according to the invention can thus be used to further reduce the calculation time needed to obtain a sub-hologram.

The method for processing a sequence of holographic images which has just been described in its various implementations can be implemented by a device for processing a sequence of holographic images with a view to reproducing it on a holographic display device displaying to at least one observer.

According to another aspect, the invention relates to a device for processing a sequence of holographic images with a view to reproducing it on a holographic display device displaying to at least one observer, a subset of relevant wavelet coefficients for the reconstruction of the sub-hologram visible for the at least one observer from at least one observation point being selected from a decomposition of at least one holographic image on a wavelet basis and from information representing a location of the at least one observer with respect to the display device, the device being characterized in that it comprises a unit for the decomposition of the at least one holographic image on a Shannon wavelet basis.

According to a particular implementation, the device additionally includes units configured to:

determine maximum and minimum diffraction angles of an incident ray on the hologram, which are subtended by the at least one observation point, determine minimum and maximum frequencies for creating a diffraction of an incident ray according to the determined angles, determine a Shannon wavelet, the frequency range of which is equal to the difference between the determined frequencies and the central frequency of which is equal to half the sum of the determined frequencies, and obtain a sub-hologram by convolution of the holographic image and the determined Shannon wavelet.

The invention relates also to an item of server equipment comprising a device for processing a sequence of holographic images.

The invention relates also to a holographic reproduction terminal comprising a device for processing a sequence of holographic images and a viewing device.

The invention relates also to a computer program containing instructions for the implementation of the steps of a method for processing a sequence of holographic images as described previously, when this program is executed by a processor. Such a program can use any programming language. It can be downloaded from a communication network and/or saved on a computer-readable medium.

Lastly, the invention relates to a storage medium, readable by a processor, integrated or not integrated with the processing device, possibly removable, storing a computer program implementing a processing method as described previously.

The abovementioned recording media can be any entity or device capable of storing the program and readable by an item of equipment. For example, the media can include a means of storage such as a ROM, for example a CD-ROM or a microelectronic circuit ROM, or a magnetic recording means, for example a floppy disk or a hard disk, or a flash memory.

On the other hand, the recording media can correspond to a transmittable medium such as an electrical or optical signal, which can be conveyed via an electrical or optical cable, via radio or via other means. The programs according to the invention can be in particular downloaded over an Internet type network.

The servers, terminals, devices, programs and information media exhibit at least advantages similar to those provided by the processing method described above.

LIST OF FIGURES

Other features and advantages of the invention will become clearer upon reading the following description of a particular implementation, given by way of simple illustrative and nonlimiting example, and from the appended drawings in which.

DETAILED DESCRIPTION

Figure 1:
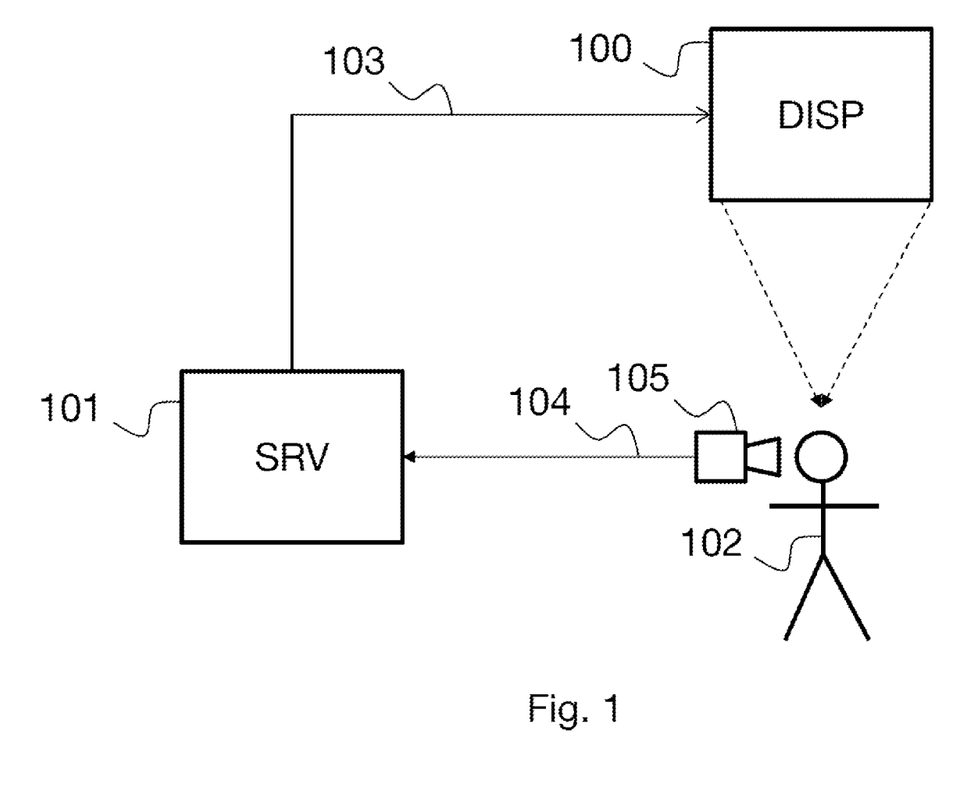
FIG. 1 illustrates an architecture suitable for implementing the processing method, according to a particular implementation.

In the description that follows, with reference to FIG. 1, a display device 100 comprising a Spatial Light Modulator (SLM), for example an LCD (Liquid Crystal Display) screen, is considered. The SLM is composed of pixels. The set of pixels of the SLM needed to display a wavelet forms a pixel of the hologram, which will be considered point-based and will hereinafter be referred to as "point". The method is implemented on an item of server equipment 101 suitable for receiving information on the positioning of an observer 102 relative to the SLM. The positioning information can be captured by a movement detection device 105 and transmitted by a connection 104 to the server 101. The server 101 communicates with the display device 100 via a communication network 103. The calculated sub-holograms are transmitted in the form of wavelet coefficients to the SLM. According to a particular implementation, the method can be implemented in a reproduction device 100 or in the server 101.

The general principle of the invention relies on the decomposition of a holographic image from a Shannon wavelet basis. The inventors observed that the decomposition of a holographic image into Shannon wavelets was exhibiting advantages related to the properties of these wavelets. These advantages provide for markedly reducing the complexity of the processing operations and the memory required to implement a method for compressing a sequence of holographic images, enabling real-time execution of the method.

The properties of Shannon wavelets are for example described in an article by Carlo Cattani entitled "Shannon Wavelets Theory", and published in 2008. The mother function of a Shannon wavelet is a sine cardinal, the Fourier transform of which is a rectangular function as illustrated in FIG. 2b representing the frequency spectrum of a Shannon wavelet. A Shannon wavelet is obtained by multiplication of a sinusoidal function of determined frequency with this mother function defined for a given interval. The direction of diffraction of a light beam by a Shannon wavelet is determined by the frequency of the sinusoid, the time and space dimensions of the mother function and the orientation of the wavelet.

According to a particular implementation of the invention, a holographic image is decomposed on a basis of Shannon wavelets to which are applied particular rotation, translation and dilation parameters. These parameters are calculated for each of the points of the hologram in such a way that an incident ray passing through the wavelet thus parametered is diffracted toward at least one determined observation point. Thus, each image of the holographic image sequence is decomposed on a basis of N Shannon wavelets, thereby leading to obtaining a representation of each image of the sequence in the form of a set of N Shannon wavelet coefficients, where N is the number of points of the hologram.

Figures 3A, 3B, 3C:
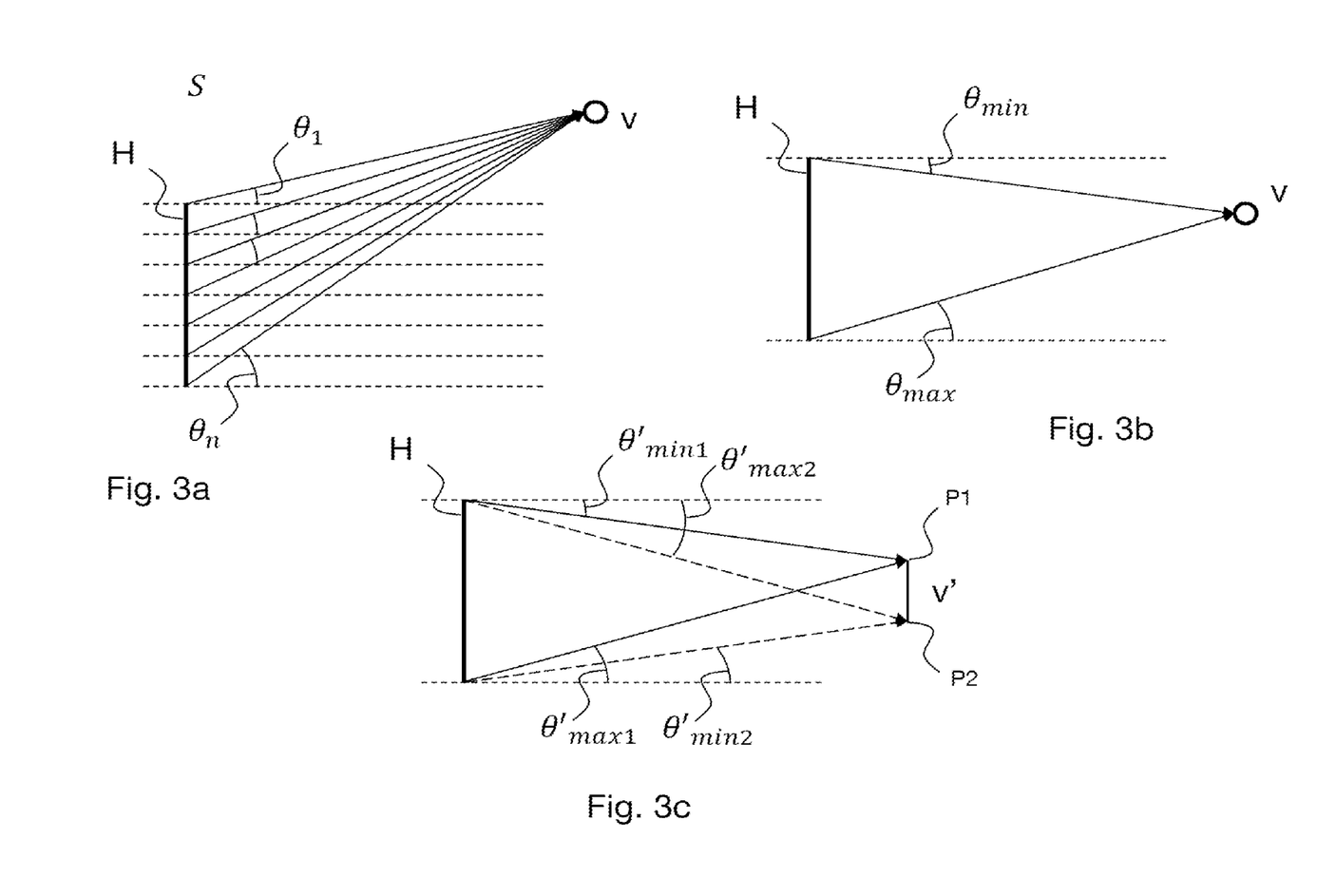
FIG. 3a represents a hologram in one dimension and rays diffracted toward an observation point.
FIG. 3b represents the minimum and maximum diffraction angles subtended by an observation point.
FIG. 3c represents the minimum and maximum diffraction angles subtended by an observation window.

With reference to FIG. 3a, a two-dimensional space S containing a hologram H is considered, the hologram including n points, the points being indexed by k. By way of example, the hologram represented in FIG. 3a includes one dimension and is composed of seven points. Of course, the invention applies in the same way to two-dimensional holograms and it is only for the sake of simplification of the description that the example is given for a one-dimensional hologram. The hologram can be defined as follows:

$$H=\{H_1, H_2, H_3, \ldots, H_n\} \quad (1)$$

An observation point V belonging to S is also considered. Of course, the invention also applies when the space S has three dimensions and/or a plurality of observation points. For example, when several observers look at a hologram, the invention provides an optimized selection of sub-holograms visible by the various observers.

According to a first step, the method according to the invention proposes determining a frequency for each index point k of the hologram H, this frequency being such that the incident ray on this point is diffracted toward the observation point V. To that end, the method utilizes the properties of diffraction gratings.

Let X: R→R² be a function making any point of S correspond to a position according to two dimensions (in this example, the two dimensions correspond to the position of the index point k in the hologram and to its distance relative to the observation point V. The position of the index point k belonging to H is given by X(k). The position of the point V t in this same system is given by X(V).

Let α: R²→R be a function making X(V) correspond to the spherical coordinates $\alpha(V)=\{\theta_1, \theta_2, \theta_3, \ldots, \theta_n\}$ corresponding to the angle subtended by the point V for each of the index points k of the hologram H represented in FIG. 3a.

Also, let g: R→R be a function giving the localized spatial frequency from α(V).

Hence the frequency is obtained for creating a diffraction of an incident ray from each of the points of the hologram toward the observation point V, λ being the wavelength of the light:

$$f = g(\alpha(V)) \tag{2a}$$

$$f_V = \frac{\sin(\alpha(V))}{\lambda} \tag{2b}$$

$$f_V = f_1, f_2, f_3, \ldots, f_n \tag{2c}$$

It is appropriate to recall that the example used here to support the description corresponds to a hologram with only one dimension. Since the hologram is hence in the same plane as the observation point, the direction of diffraction is determined only by the angle subtended by the point V. In the case of a two-dimensional hologram in a three-dimensional space, it is appropriate to also take into account the orientation for causing a diffraction toward the point V For example, with reference to FIG. 5, which illustrates a two-dimensional holographic image 500 and a plane 501 comprising an observation point V (502) in a three-dimensional space, the diffraction of the incident ray 503 toward the observation point 502 is determined not only by the angle subtended by the point V denoted by θ(V) in the figure (zenith angle), but also by the rotation angle denoted by φ(V) (azimuth angle).

According to a particular implementation, the method according to the invention includes a step for determining a sub-hologram able to generate a diffraction toward at least one observation point. To that end, the method proposes determining, for each index point k of the hologram, a Shannon wavelet ψ obtained by multiplication of a sinusoidal function, the frequency of which is suitable for causing a diffraction at the index point k toward at least one observation point, and a sine cardinal type mother function defined over a particular interval. The sinusoidal function determines the central frequency of the wavelet and the mother function its frequency band. Thus, for each point k of the hologram H, a function ψ is determined, centered on the point k, the frequency $f_k$ of which is suitable for producing a diffraction toward a particular observation point.

Thus, the set of wavelets providing a diffraction toward a particular observation point is denoted by:

$$\psi_V = \{\psi_{1,f_1}, \psi_{2,f_2}, \psi_{3,f_3}, \ldots \psi_{n,f_n}\} \tag{3}$$

Figure 5:
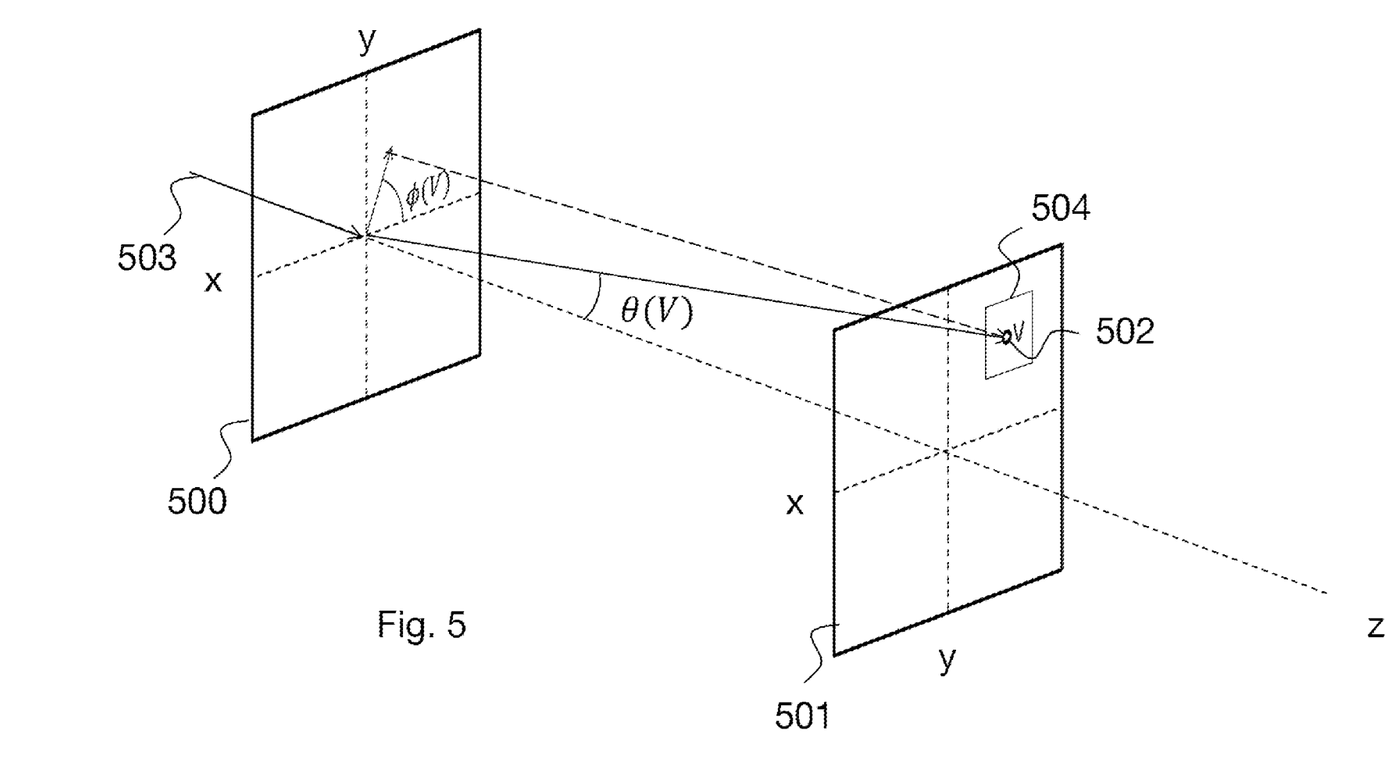
FIG. 5 illustrates the characteristic angles for obtaining a diffraction from a point of a two-dimensional hologram toward a particular observation point.

In the case of a two-dimensional hologram, a rotation is additionally applied to the wavelet so as to modify the azimuth angle of the diffracted light, denoted by φ(V) in FIG. 5.

The decomposition of Shannon wavelets $C_V$ into coefficients corresponds to a set of scalar products of a function representing the holographic image H and the base function $\psi_V$. The scalar product of $\psi_V$ and the hologram H is given by:

$$C_V = \{<H, \psi_{1,f_1}>, <H, \psi_{2,f_2}>, <H, \psi_{3,f_3}>, \ldots, <H, \psi_{n,f_n}>\} \tag{4a}$$

$$C_V(k) = \Sigma_i H \psi_{k,f_k} \tag{4b}$$

$$H_V = \Sigma_k C_V(k) \psi_{k,f_k} \tag{4c}$$

Thus, a sub-hologram $H_V$ is obtained, generating a diffraction to the observation point V. The wavelet coefficients thus calculated for each of the points can for example be transmitted over a telecommunication network and used to reconstruct the sub-hologram on a suitable display device.

Nevertheless, since it is composed of points, a hologram is of discrete nature. It is hence appropriate to discretize the wavelets used. A Shannon wavelet, in its complex and continuous form, centered on the frequency $F_c$, for which the frequency band is $F_b$, is characterized by the following equation:

$$\psi_{sh} = \sqrt{F_b}(\sin c(F_b x) \cdot \exp(2i\pi F_c x)) \tag{5}$$

The Fourier transform of this wavelet is given by:

$$\widehat{\psi_{sh}} = rect\left(\frac{u - F_c}{F_b}\right) \tag{6}$$

Since the hologram H is composed of N discrete points, it is appropriate to calculate a discrete Fourier transform (DFT) of the hologram and to take into account the spacing of these points (i.e. the pitch, denoted by P) in order to discretize the Shannon wavelet. The spacing between the points of the DFT is given by:

$$D_p = \frac{1}{PN} \tag{7}$$

The size of the wavelet must be at least sufficient to cover a half-period of the base sinusoid. Thus, the number of discrete points needed for a wavelet, i.e. its length in the spatial domain, is given by:

$$L_n = \frac{1}{f_V(k)P} \tag{8}$$

The number of discrete points of the DFT of the wavelet, i.e. its size in the frequency domain, can thus be deduced:

$$M = \frac{N}{L_n} \tag{9}$$

and the frequency band:

$$f_b = MD_p \tag{10}$$

It is observed from equations (8) and (10) that when $f_V(k)$ increases, $L_n$ decreases, thereby indicating a better spatial localization, but $f_b$ increases, thereby indicating a less good frequency localization, and vice versa.

Figure 4A:
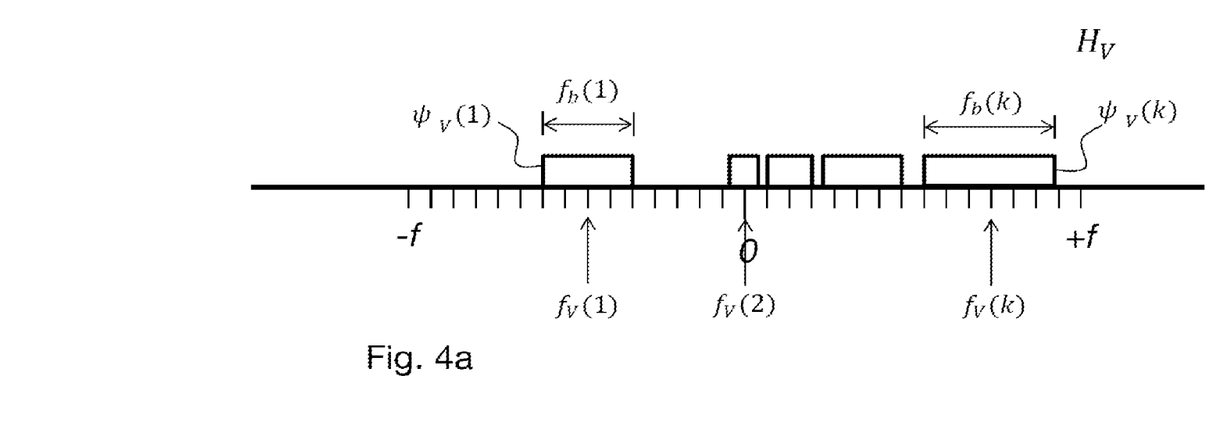
FIG. 4a represents a frequency view of a hologram in one dimension.

FIG. 4a schematically illustrates a representation in the frequency domain of a sub-hologram $H_V$ obtained by equation (4b). Each rectangular function $\psi_V(k)$ corresponds to a localized scalar product, the frequency band of which is denoted by $f_b(k)$ and the central frequency by $f_V(k)$.

Thus, the processing method proposes a decomposition of a hologram on a discretized Shannon wavelet basis given by:

$$\psi V_k(m) = \sqrt{f_b(k)}(\sin c(f_b(k)m) \cdot \exp(2i\pi f_V(k)m)) \tag{11}$$

FIG. 5 illustrates a two-dimensional holographic image 500 and a plane 501 comprising an observation point V (502) in a three-dimensional space. An incident ray 503 is picked out. It is observed that the Shannon wavelet that this incident ray passes through generates a light ray diffracted toward the observation point V according to an azimuth angle $\theta(V)$ and a zenith angle $\phi(V)$. Since the Shannon wavelet is discretized, continuous changes of the values $(\theta, \phi)$ do not generate continuous changes of the pair (O, S). Therefore, a range $\delta$ is defined in order that each pair (O, S) correspond to $[\theta-\delta, \theta+\delta]$ $[\phi-\delta, \phi+\delta]$. The parameter $\delta$ corresponds to an approximation of the ideal direction of diffraction and provides for anticipating the movements of the observer. This parameter corresponds to the bandwidth $f_b$ of the Shannon wavelet. With reference to FIG. 2b, it is observed that the Fourier transform of a Shannon wavelet is a rectangular function. The wavelet thus has the same energy over its entire frequency band. On the other hand, as FIG. 2a shows, which represents a Fourier transform of a Gabor wavelet, the energy of a Gabor wavelet is concentrated around its central frequency and decreases rapidly upon moving away from this frequency. While according to the prior art a new sub-hologram must be calculated as soon as the user moves away from the observation point for which a first sub-hologram was calculated, the fact that a Shannon wavelet preserves the same energy over the entire range defined by $\delta$ means that the user can move away from the observation point to a certain extent determined by $\delta$ without it being necessary to recalculate a sub-hologram. Thus, while the prior art requires calculating several sub-holograms in order to anticipate movements of the user, the method according to the invention enables a reduction in the number of sub-holograms to be precalculated, this reduction resulting in reducing the complexity of the processing operations and the memory needed to store these sub-holograms. The method thus exhibits a certain advantage over the prior art.

A sub-hologram $H_V$ is obtained from the minimum number of wavelet coefficients which is necessary to create a diffraction to the point V. Conventionally, the sub-hologram can be calculated by a scalar product of the set of parametered wavelets and the set of points of the holographic image. This calculation requires $L \times n$ complex multiplications and $L \times n$ complex additions, where L is the number of discrete points in the wavelet $\psi_V(k)$ and n is the number of points in the holographic image. It is observed that the calculation of a sub-hologram causing a diffraction to the point V is particularly costly in calculation time according to this method. On the other hand, this approach also requires a significant quantity of memory to store the vectors $\psi_V$ for each $L \times n$ points of the hologram. For the hologram to be visible from several observation points, for example from N points, the memory required will be $L \times n \times N$ complex values. Likewise, the complexity of the calculation will be in the order of $L \times n \times N$ complex multiplications and $L \times n \times N$ complex additions. This complexity corresponds to the calculation of a sub-hologram according to only one dimension. For the case of a conventional two-dimensional hologram, the complexity of the calculation for a hologram including $n \times m$ points which is visible from a viewing area having $N \times M$ positions will be in the order of $L^2 \times n \times m \times N \times M$ complex multiplications and of $L^2 \times n \times m \times N \times M$ complex additions, with a memory occupation of $L^2 \times n \times m \times N \times M$ complex values.

Such complexity prevents a real-time calculation.

In order to reduce the complexity and provide a real-time processing operation, the invention proposes, according to a particular implementation, a method suitable for calculating the sub-holograms in the frequency domain so as to reduce the complexity of the processing operation and the memory required. To that end, the invention takes advantage of a property of Shannon wavelets according to which the Fourier transform of such a wavelet is a rectangular function.

Figure 4B:
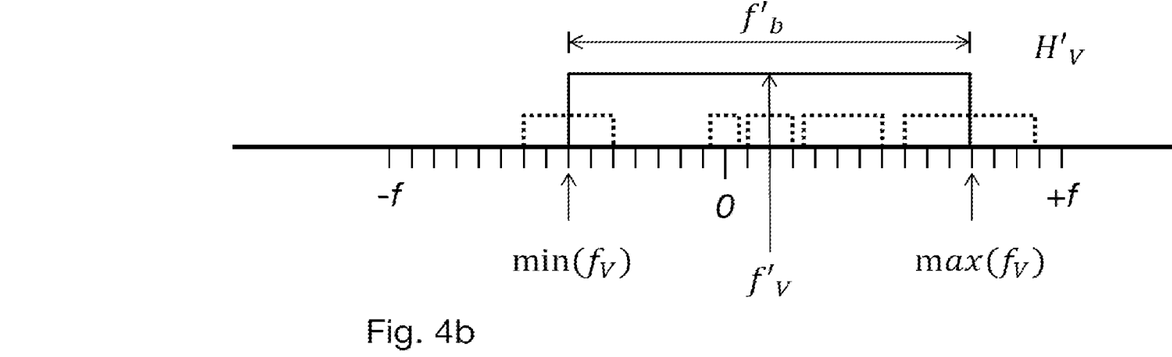
FIG. 4b illustrates a rectangular function, the frequency band and the central frequency of which are determined according to a particular implementation of the invention.

With reference to FIG. 4b, the invention proposes determining a rectangular function suitable for covering the frequencies causing a diffraction of the light to the point V.

Figure 6:
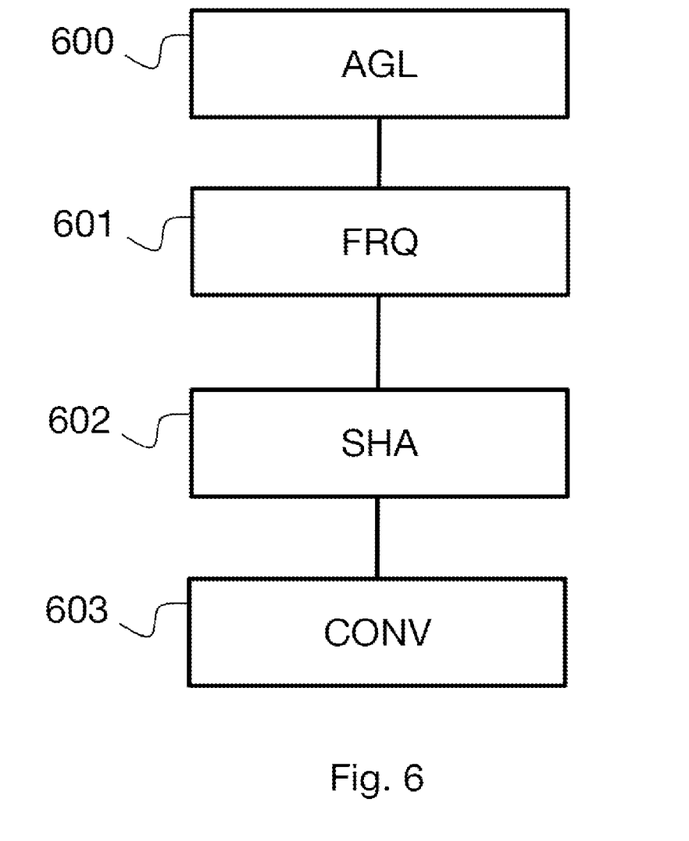
FIG. 6 illustrates in the form of a diagram the main steps of the processing method according to a particular implementation of the invention.

FIG. 6 illustrates the main steps of the processing method according to a particular implementation.

According to a particular implementation, the calculation of a sub-hologram visible from the observation point comprises a first step denoted by 600 in FIG. 6 for determining the maximum and minimum angles of diffraction of an incident ray subtended by the observation point. FIG. 3b represents a hologram H and an observation point V. The minimum incident diffraction angle on the observation point V is denoted by $\theta_{min}$. The maximum incident diffraction angle on the observation point V is denoted by $\theta_{max}$. These angles can be determined from the position of the observer relative to the holographic reproduction device. The position of the observer can be known by virtue of an eye-tracking or movement detection device.

During a step 601, the method proposes determining a frequency for causing a diffraction of an incident ray according to the determined minimum angle and a frequency for causing a diffraction of an incident ray according to the determined maximum angle. The frequency corresponding to a diffraction angle is given by equation (2b).

At step 602, a Shannon wavelet is determined, the wavelet being such that its frequency range is equal to the difference between the determined minimum and maximum frequencies, and its central frequency is equal to half the sum of the determined frequencies. Thus, the frequency band is given by the equation:

$$f'_b = \max(f_v) - \min(f_v) \tag{12}$$

and the central frequency by the equation:

$$f'_V = \frac{\max(f_V) + \min(f_V)}{2} \tag{13}$$

The corresponding Shannon wavelet is hence given by:

$$\psi'_V(m) = \sqrt{f'_b}(\sin c(f'_b m) \cdot \exp(2i\pi f'_V m)) \tag{14}$$

The sub-hologram corresponding to the observation point can be obtained by a scalar product of the hologram and the wavelet obtained at step 602. However, an advantage of the invention over the prior art is that it provides for obtaining the sub-hologram by a simple convolution operation performed at step 603. In the frequency domain, this convolution operation corresponds to a simple multiplication and provides for very significantly reducing the number of complex multiplications to be performed to calculate the sub-hologram.

It is observed in FIG. 4b that the sub-hologram H'$_V$ obtained is a superset of the sub-hologram H$_V$ obtained by the method represented in FIG. 4a. The sub-hologram H'$_V$ contains all the frequencies required for a diffraction to the point V but also additional frequencies, since all the frequencies (discrete) between min (f$_V$) and max (f$_V$) are selected. This has the effect of slightly lowering the effectiveness of the compression, but the gain in terms of complexity of the processing operations and memory requirements is particularly advantageous.

On the other hand, since the sub-hologram is entirely calculated in the frequency domain, the method according to the invention also exhibits advantages during the reconstruction of the sub-hologram, since it avoids having to recalculate Fourier transforms.

In most cases, a single sub-hologram causing a diffraction toward only one observation point is not satisfactory. This is because the hologram is no longer visible when the observer moves slightly. It is hence necessary to calculate several sub-holograms corresponding to each of the points of a viewing window, such as for example the viewing window 504 represented in FIG. 5, i.e. a window from which the hologram must be visible. Thus, the observer can move in the limit of the viewing window and continue to see the hologram. According to the prior art, the complexity of the processing operation is then multiplied by the number of points of the viewing window.

According to a particular implementation, the method proposes calculating the maximum $\theta'_{max}$ and minimum $\theta'_{min}$ diffraction angles incident on the viewing window and determining the frequencies causing such diffractions. Thus, an incident ray on any point of the viewing window will have an angle of incidence of between $\theta'_{min}$ and $\theta'_{max}$. FIG. 3c represents a hologram H having one dimension and an observation window V', the endpoints of which are denoted by P1 and P2. The maximum and minimum angles subtended by the point P1 are denoted by $\theta'_{min1}$ and $\theta_{max1}$. The maximum and minimum angles subtended by the point P2 are denoted by $\theta'_{min2}$ and $\theta'_{max2}$. The minimum and maximum angles incident on the observation plane V' can hence be deduced, the minimum angle $\theta'_{min}$ being equal to min($\theta'_{min1}$, $\theta'_{min2}$) and the maximum angle $\theta'_{max}$ being equal to max($\theta'_{max1}$,$\theta'_{max2}$). It is thus possible to determine, from the equations specific to the diffraction gratings, the minimum and maximum frequencies causing an incident diffraction on the viewing window. From these minimum and maximum frequencies, steps 602 and 603 of the method provide for calculating a sub-hologram visible over the whole of the viewing window by a simple multiplication of the Fourier transform of the hologram by the Fourier transform of the Shannon wavelet obtained.

Figure 7:
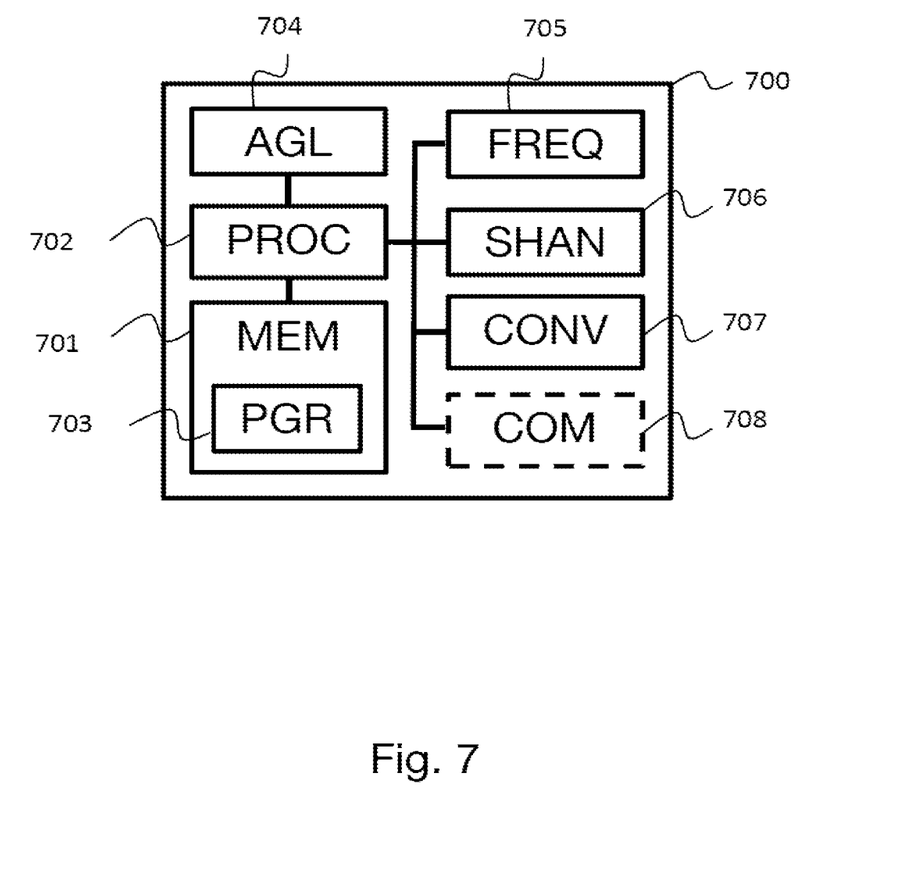
FIG. 7 represents the architecture of a processing device according to a particular implementation of the invention.

FIG. 7 represents the architecture of a device 700 for processing a holographic image.

The device 700 comprises a storage space 701, for example a memory MEM, and a processing unit 702 equipped for example with a processor PROC. The processing unit can be driven by a program 703, for example a computer program PGR, implementing the processing method as described in the invention with reference to FIG. 6, and notably the steps for determining the maximum and minimum diffraction angles of an incident ray on the hologram which are subtended by the at least one observation point, for determining the minimum and maximum frequencies for creating a diffraction of an incident ray according to the determined angles, for determining a Shannon wavelet, the frequency range of which is equal to the difference between the determined frequencies and the central frequency of which is equal to half the sum of the determined frequencies, and for obtaining a sub-hologram by convolution of the holographic image and the determined Shannon wavelet.

Upon initialization, the instructions of the computer program 703 are for example loaded into a RAM (Random Access Memory) memory before being executed by the processor of the processing unit 702. The processor of the processing unit 702 implements the steps of the processing method according to the instructions of the computer program 703.

To this end, the device comprises, in addition to the memory 701, a unit 704 configured to determine maximum and minimum diffraction angles of an incident ray on the hologram which are subtended by the at least one observation point. With this aim, the device can use data obtained from a device for detecting movement of an observer, this device being able to be directly connected to the processing device or communicate with the processing device via a communication network. In that case, the processing device can comprise a communication unit, such as for example a network card, suitable for transmitting and receiving data, such as for example positioning data of an observer relative to a holographic reproduction device. The communication device 708 can also be used to transmit a sub-hologram calculated according to the invention to a holographic reproduction device, such as for example an SLM. The processing device also comprises a module 705 (FREQ) configured to determine minimum and maximum frequencies for creating a diffraction of an incident ray according to the determined angles. The unit 705 can implement an algorithm suitable for calculating diffractions in a diffraction grating and in particular for implementing equation (2b). The device also comprises a unit 706 (SHAN) configured to obtain a Shannon wavelet, the frequency range of which is equal to the difference between the determined frequencies and the central frequency of which is equal to half the sum of the determined frequencies. To that end, the module 706 can implement equations (12) and (13) in the form of an algorithm for obtaining equation (14). Lastly, the processing device comprises a unit 707 (CONV) for calculating a sub-hologram through a convolution operation carried out from a Fourier transform of a hologram and a Fourier transform of the Shannon wavelet determined by the module 706. The communication unit 708 can be used to transmit the coefficients resulting from the convolution operation to a holographic reproduction device.

According to a particular implementation, the device can be integrated in an item of server equipment suitable for communicating with a holographic reproduction device, or integrated directly in an item of holographic reproduction equipment.

The invention claimed is:

1. A method comprising:
    processing a sequence of holographic images by a processing device with a view to reproducing the sequence on a holographic display device displaying to at least one observer, wherein processing comprises:
    selecting a subset of relevant wavelet coefficients for reconstruction of a sub-hologram visible for the at least one observer from at least one observation point, the subset being selected from a decomposition of at least one holographic image on a Shannon wavelet basis and from information representing a location of the at least one observer with respect to the display device; and transmitting the sub-hologram to the holographic display device.

2. The method as claimed in claim 1, wherein the reconstruction of the sub-hologram visible by the at least one observer from the at least one observation point comprises:

determining maximum and minimum diffraction angles of an incident ray on the hologram, which are subtended by the at least one observation point, determining minimum and maximum frequencies for creating a diffraction of an incident ray according to the determined angles, determining a Shannon wavelet having a frequency range equal to the difference between the determined frequencies and a central frequency equal to half the sum of the determined frequencies, and obtaining the sub hologram by convolution of the holographic image and the determined Shannon wavelet.

3. The method as claimed in claim 2, wherein the convolution is carried out in the frequency domain between the Fourier transform of the hologram and the Fourier transform of the determined Shannon wavelet.

4. A device comprising:

a processor; and a non-transitory computer-readable medium comprising instructions stored thereon, which when executed by the processor configure the device to process a sequence of holographic images with a view to reproducing the sequence on a holographic display device displaying to at least one observer, wherein processing comprises:

selecting a subset of relevant wavelet coefficients for reconstruction of the sub-hologram visible for the at least one observer from at least one observation point, the subset being selected from a decomposition of at least one holographic image on a Shannon wavelet basis and from information representing a location of the at least one observer with respect to the display device; and transmitting the sub-hologram to the holographic display device.

5. The device as claimed in claim 4, wherein the instructions further configure the processor to:

determine maximum and minimum diffraction angles of an incident ray on the hologram, which are subtended by the at least one observation point, determine minimum and maximum frequencies for creating a diffraction of an incident ray according to the determined angles, determine a Shannon wavelet having a frequency range equal to the difference between the determined frequencies and a central frequency equal to half the sum of the determined frequencies, and obtain a sub-hologram by convolution of the holographic image and the determined Shannon wavelet.

6. A server comprising the device as claimed in claim 4.

7. A holographic reproduction terminal comprising the device as claimed in claim 4 and the holographic display device.

8. A non-transitory computer-readable information medium on which there is recorded a computer program comprising instructions for execution of a method of processing a sequence of holographic images by a processing device with a view to reproducing the sequence on a holographic display device displaying to at least one observer, when the instructions are executed by a processing device, wherein processing comprises:

selecting a subset of relevant wavelet coefficients for reconstruction of a sub-hologram visible for the at least one observer from at least one observation point, the subset being selected from a decomposition of at least one holographic image on a Shannon wavelet basis and from information representing a location of the at least one observer with respect to the display device; and transmitting the sub-hologram to the holographic display device.

* * * * *